J. I. EDGERTON.
ANTISKIDDING CHAIN.
APPLICATION FILED JAN. 12, 1910.
968,751.
Patented Aug. 30, 1910.
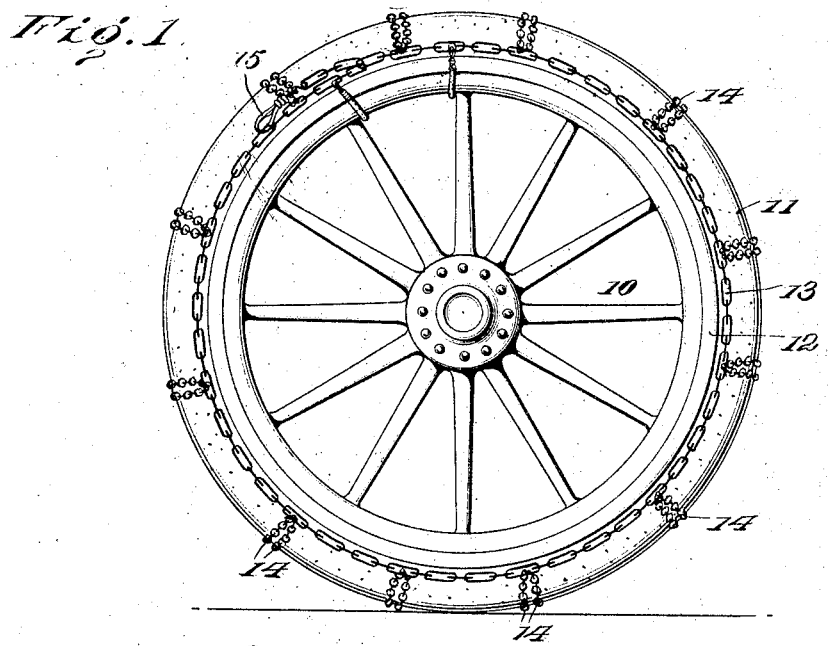
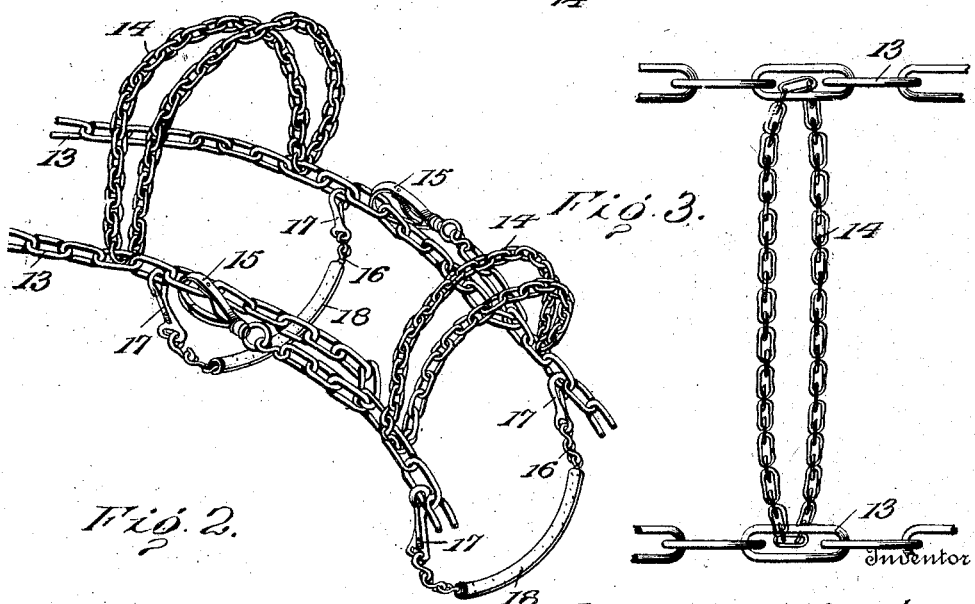
Witnesses
L. B. Baker
K. E. Klein.
Inventor
James Ives Edgerton
By Dudley, Browne & Phelps
Attorneys

UNITED STATES PATENT OFFICE.

JAMES IVES EDGERTON, OF NEW YORK, N. Y.

ANTISKIDDING CHAIN.

968,751.

Specification of Letters Patent.  Patented Aug. 30, 1910.

Application filed January 12, 1910. Serial No. 537,707.

*To all whom it may concern:*

Be it known that I, JAMES IVES EDGERTON, a citizen of the United States, residing at New York, in the county of New York and State of New York, have invented certain new and useful Improvements in Antiskidding Chains, of which the following is a specification.

My invention relates to certain new and useful improvements in anti-skidding chains for automobiles and the like and the object of my invention is to provide a chain having great durability and one in which the wear is evenly distributed over a large body of chain instead of being confined to a few links.

A further object of my invention is to provide means whereby the chain may be more easily placed and secured in position on the wheel.

With these and other objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs: Figure 1 is a side elevation of a wheel fitted with my invention; Fig. 2 is a detail perspective view of a portion of the preferred form of chain with the parts in position, and Fig. 3 is a detail plan view of a portion of the chain.

10 designates a wheel provided with a tire 11 mounted on the rim 12, these parts being shown merely for the purpose of illustrating the application of my invention.

13 is a pair of parallel side chains which are connected together at intervals by the transverse endless chains 14 which pass through links in the chains as shown. The links of the side chains through which the transverse chains pass are of such a size as to permit the transverse chains to readily slip through them. In the form of my invention shown all the links of the side chains are the same size but this is immaterial as it is only necessary that the links of these chains through which the transverse chains pass be of a size to permit the passage of the side chains while the other links of said chains may be of any size or form described.

Preferably and as shown I provide at one end of each of the side chains a means to engage a link of the side chain at the other end, such means being shown as comprising a pair of snap-hooks 15 which may be passed bodily through the end links and then the chain doubled back and the hook snapped into a link after the side chain has been drawn taut.

In order to assist in placing the chains on the tire I preferably provide a pair of chains 16 provided with a snap hook 17 at each end thereof, these chains being also preferably covered with rubber tubing 18 or the like to prevent marring the wheel. In the operation of these attaching chains, one of them is attached adjacent each end of one of the side chains adjacent the end cross chain, and then the attaching chain is passed under the rim and is secured to a link of the opposite side chain. The wheel can now be revolved and the cross chains arranged across the tire with the side chains in position. When the chain has been completely wrapped around the tire the second attaching chain may be passed under the rim to hold the free end while the snap hooks 15 are passed through the end links and then drawn back to pull the side chains taut when the hooks are engaged with whatever link they may reach. The attaching chains may now be disengaged on one side and snapped back on the same side chains or removed entirely.

It will be observed that by having the cross chains endless and passing through links of the side chains sufficiently large to permit the slipping of the cross chains through the links, the links covering the tread of the wheel will change and the wear will consequently be distributed over the entire length of the cross chains instead of being confined to a few links thereof. It is evident that this changing of the tread portion of the cross-chains can be effected by hand by merely sliding the cross chains through the links of the side chains.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a device of the class described, the combination with a pair of side chains, of a series of endless transverse chains, each of which passes through a single link carried by the side chains, whereby the runs of said transverse chains are side by side, the links through which the transverse chains pass and the transverse chains being of such relative size as to permit the latter to slide through the former.

2. In a device of the class described, the combination with a pair of side chains, of a series of endless transverse chains, each of said transverse chains passing through a single link of each side chain, said links through which the transverse chains pass forming part of the side chains, the links of the side chains through which the transverse chains pass and the transverse chains being of such relative size as to permit the latter to slide through the former.

3. The combination with an anti-skidding device for wheels, said device being formed of a pair of side chains connected together by an anti-skidding tread adapted to extend across the tire of the wheel, of a device for temporarily holding one end of said side chains while their ends are being fastened together, said device comprising a flexible section provided with means at each end for detachably engaging the side chains adjacent one end thereof and to be passed beneath the felly of the wheel to which the anti-skidding device is to be attached whereby said device may be readily wound upon the wheel and the ends of the side chains secured together.

In testimony whereof I affix my signature in presence of two witnesses.

JAMES IVES EDGERTON.

Witnesses:
WM. R. MOORE,
FRANCIS M. PHELPS.